(No Model.) 2 Sheets—Sheet 2.
A. E. HARRIS.
SUSPENDING OVERHEAD ELECTRIC WIRES.
No. 388,487. Patented Aug. 28, 1888.
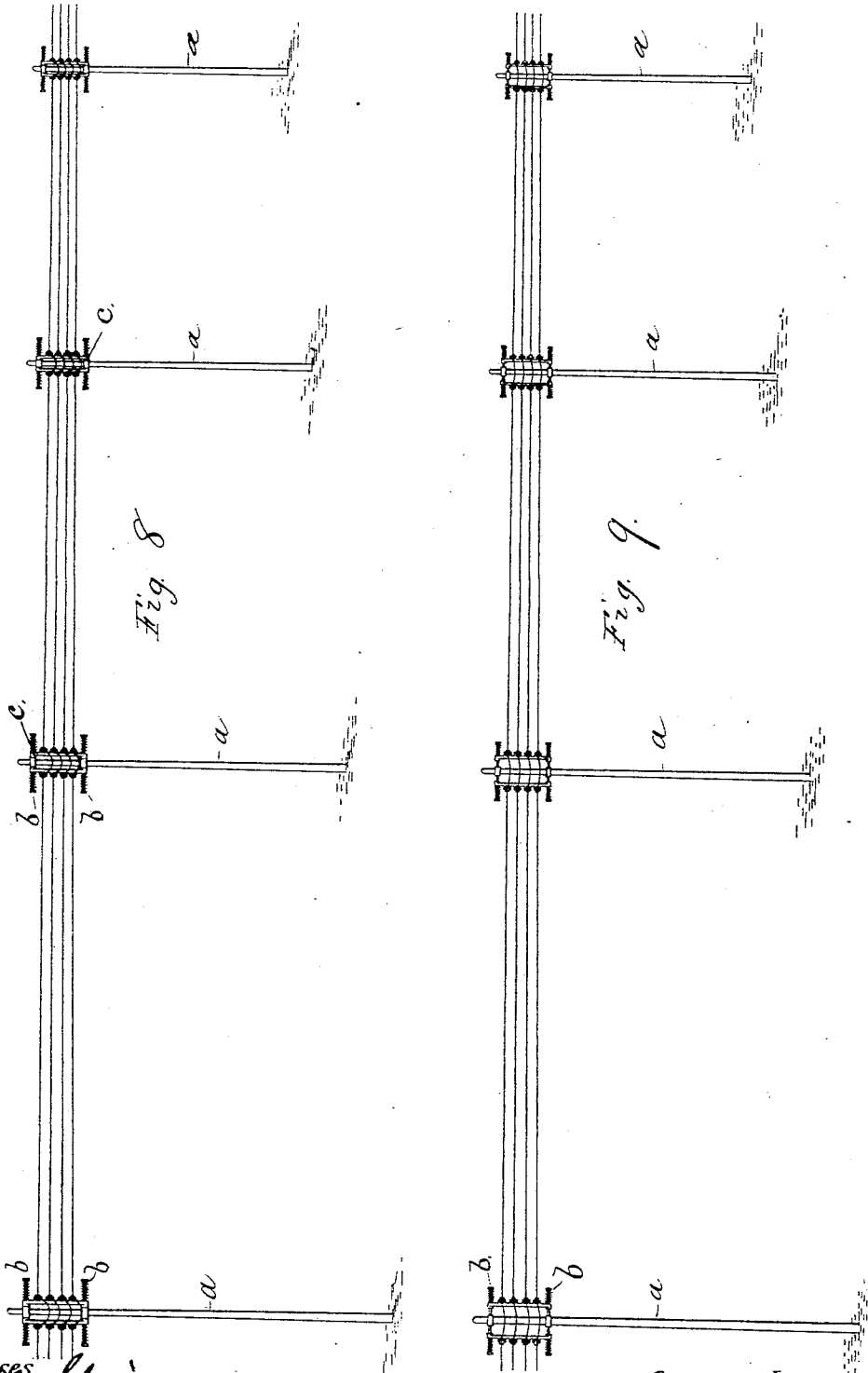

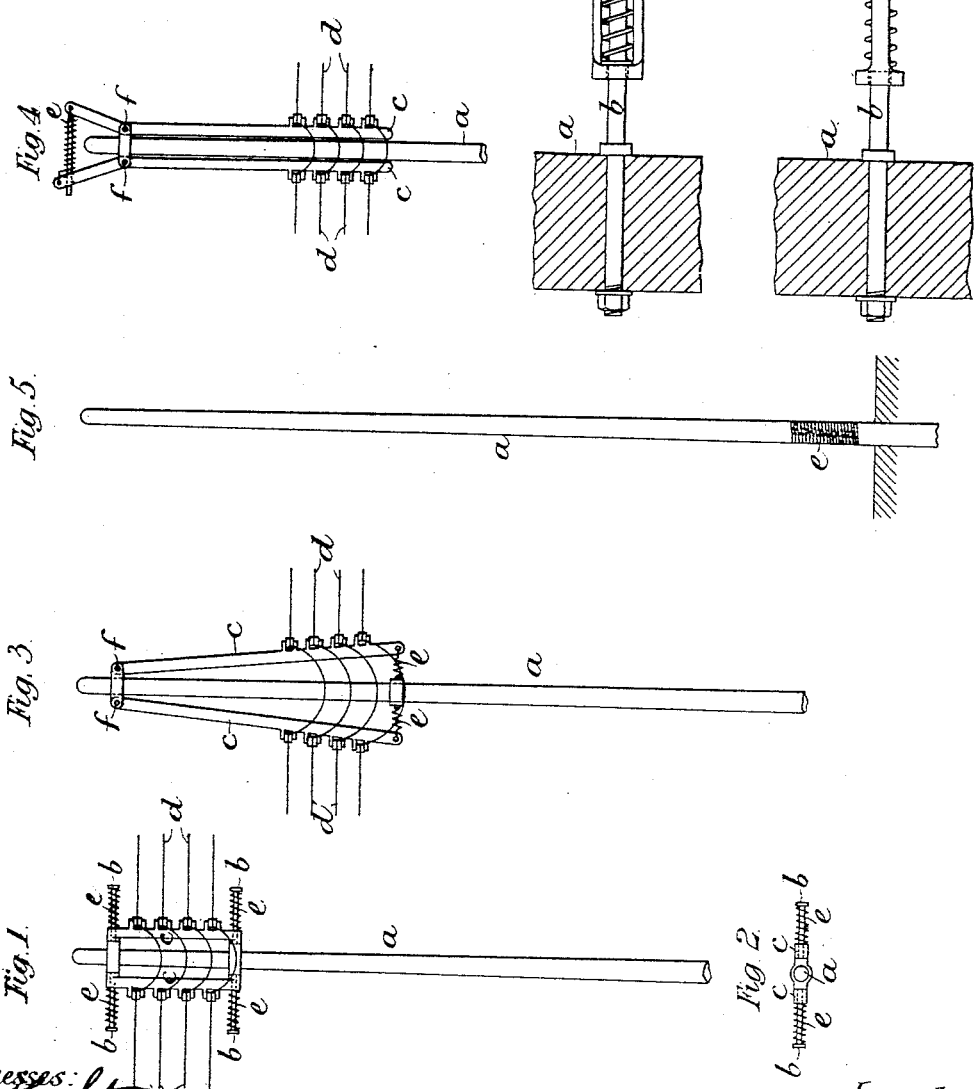

UNITED STATES PATENT OFFICE.

ALFRED E. HARRIS, OF LONDON, ENGLAND.

SUSPENDING OVERHEAD ELECTRIC WIRES.

SPECIFICATION forming part of Letters Patent No. 388,487, dated August 28, 1888.

Application filed March 4, 1887. Serial No. 229,731. (No model.) Patented in England December 29, 1886, No. 17,052.

*To all whom it may concern:*

Be it known that I, ALFRED ELLIS HARRIS, a subject of the Queen of Great Britain, residing at London, England, have invented new and useful Improvements in Suspending Overhead Telegraph, Telephone, and like Wires, (for which I have obtained a patent in Great Britain, No. 17,052, dated December 29, 1886,) of which the following is a specification.

This invention relates to suspending telegraph, telephone, and like wires in such a manner that they shall not be liable to be broken from the effects of the weather; and the invention consists in so joining or connecting the wires to their posts or supports that in the event of the wires contracting from the effects of cold, or by their being subjected to a weight of snow or being acted upon by a high wind, the connections will, by being formed of a spring or a socket and set-screw, or of jointed levers, or in any other suitable manner, expand or be elongated so as to release the wires from the strain to which they are subjected.

In order to enable my invention to be fully understood, I will proceed to describe, by reference to the accompanying drawings, several suitable arrangements for carrying the same into practice.

In the drawings, Figure 1 is an elevation, and Fig. 2 a transverse section, of a telegraph post or pole having my improvements applied thereto. Fig. 3 shows the movable arms pivoted or jointed on the post. Fig. 4 shows pivoted arms, the spring being above instead of below the joints. Fig. 5 shows the spring placed in the post itself, thus allowing it to bend or yield as required. Figs. 6 and 7 show the spring with a link arrangement; Fig. 8, a representation of a series of poles with the line-wires thereon in their normal or unstrained state, and Fig. 9 a similar view when the lines are subjected to a strain.

In Figs. 1 and 2, $a$ is a telegraph post or pole, which I provide with rods $b\,b$. On these rods slide vertical bars or arms $c\,c$, to which bars or arms are connected the telegraph-wires $d\,d$. $e\,e$ are the springs on the bars $b\,b$, which normally keep the bars or arms $c\,c$ in the position shown in Fig. 1 of the drawings; but should the wires $d\,d$ contract or be subjected to any undue strain from any cause whatever the springs $e\,e$ will be compressed, and the bars $c\,c$, moving outward from the post $a$, will relieve the strain or pressure on the wires $d\,d$, and thereby prevent them breaking. The wires $d\,d$ between the insulators are joined up in any suitable manner.

In Fig. 3 the arms $c\,c$ are shown jointed to the upper part of the post at $f\,f$, the springs $e\,e$ keeping the lower ends of the bars $c\,c$ in their normal position. The action of this arrangement is as follows: Any undue strain upon the wires will tend to stretch the springs $e\,e$, and the bars $c\,c$, moving outward from the post, as before stated, will relieve the strain upon the wires.

In Fig. 4 the arrangement shown is substantially the same as that shown in Fig. 3, except that the bars $c\,c$ are extended above the joints $f\,f$ and their upper ends are connected by a spring, $e$.

In Fig. 5 I provide the post $a$ itself with a spring, $e$, which will allow the post to bend at the spring if the wires are strained to an abnormal extent. Figs. 6 and 7 show an elevation and a section showing the wire $d$, connected to the post $a$ or wall or the like by a spring-link arrangement.

All the arrangements hereinbefore described and illustrated have the same object in view—namely, to allow of the wires $d$, when subjected to undue strain or pressure, to accommodate themselves by the agency of the spring or springs to such change of position as may be caused by contraction, or by a weight of snow, or by a high wind, &c., and thereby prevent their liability to break as when suspended by the ordinary means hitherto in use.

Having now particularly described and ascertained the nature of my said invention and in what manner the same is to be performed, I declare that what I claim is—

The combination, with a series of telegraph or telephone poles for suspending or connecting the line-wire, of a pair of movable bars normally held to place by springs and applied to the opposite sides of the pole near its top, as set forth, and adapted to recede from each other and relieve the strain on the wire under stress of weather, all substantially as set forth.

A. E. HARRIS.

Witnesses:
A. S. ALBUTT,
G. F. TYSON.